(No Model.)
T. A. EDISON.
VACUUM APPARATUS.
No. 263,147. Patented Aug. 22, 1882.
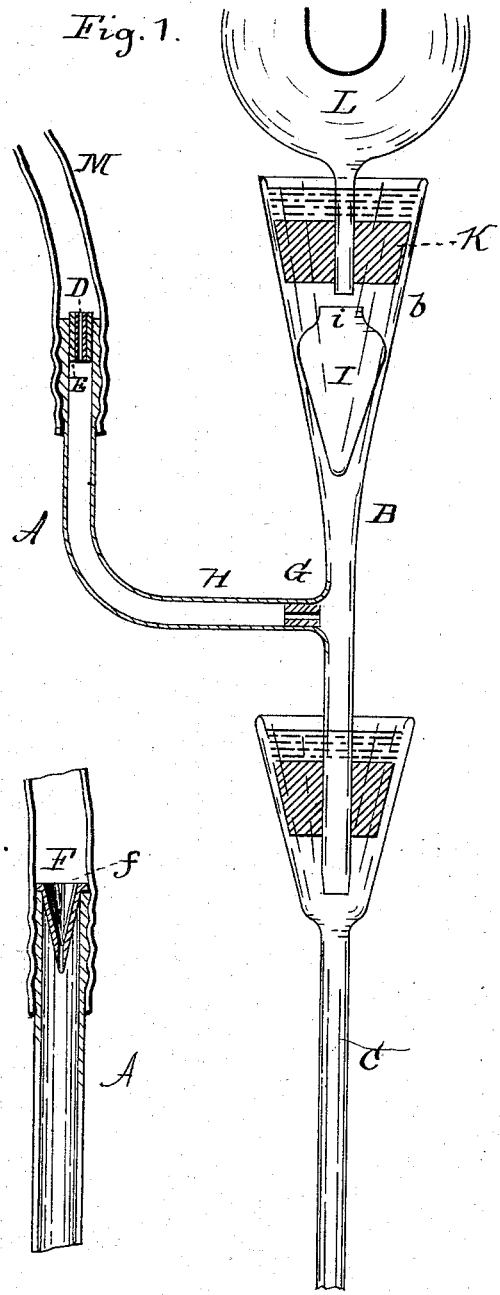
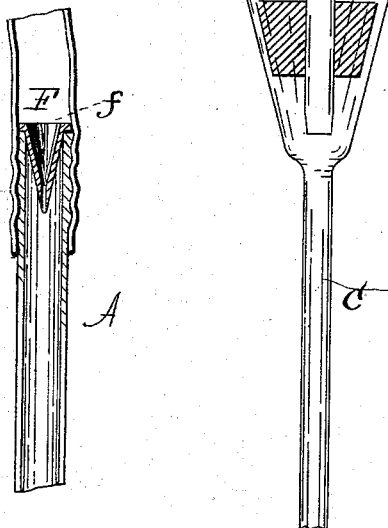
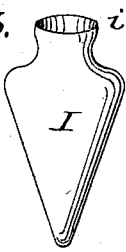
Fig. 1.
Fig. 2.
Fig. 3.
WITNESSES:
INVENTOR:
T. A. Edison
BY Dyer & Wilber
ATTORNEYS.

United States Patent Office.

THOMAS A. EDISON, OF MENLO PARK, NEW JERSEY, ASSIGNOR TO THE EDISON ELECTRIC LIGHT COMPANY, OF NEW YORK, N. Y.

VACUUM APPARATUS.

SPECIFICATION forming part of Letters Patent No. 263,147, dated August 22, 1882.

Application filed August 30, 1881. (No model.)

*To all whom it may concern:*

Be it known that I, THOMAS A. EDISON, of Menlo Park, in the county of Middlesex and State of New Jersey, have invented a new and useful Improvement in Vacuum Apparatus, (Case No. 336;) and I do hereby declare that the following is a full and exact description of the same, reference being had to the accompanying drawings, and to the letters of reference marked thereon.

The object I have in view is to produce a simpler, cheaper, and more efficient construction of the Sprengel drop-pump for producing high vacuo.

In carrying out my invention I provide the pump with the following novel features:

First. Instead of using the contraction made directly in the glass for regulating the flow of mercury, as has been practiced by me generally heretofore, I provide the first drop-tube with an inner tube having a fine bore of definite size held removably in the glass drop-tube. This inner regulating-tube is made of metal, glass, or other hard material, and is held preferably by a rubber stopple which surrounds it and is forced into the end of the drop-tube; or, the inner tube may be formed in the apex of a small funnel of proper material, having a flange resting upon the end of the glass drop-tube. Several advantages are secured by the use of this inner removable tube over the contraction made directly in the glass. The drop-tube will not be broken by the jumping up of the mercury, which in case of the glass contraction strikes the same and shatters the tube at that point. The size of the inner tube can also be changed without difficulty if it is desired to vary the flow of the mercury. The inner tube can be readily removed for cleaning it and for cleaning the drop-tube.

Second. In that form of Sprengel drop-pump where two drop-tubes are used connected by a cross-tube, forming what may be called the "trap-tube," and the trap-tube is secured to the second drop-tube by fusion of the glass at the junction, it is exceedingly difficult, if not impossible, to make the opening at the juncture of a definite predetermined size. I accomplish this by sealing within the glass at said juncture a short tube of platinum or an extra glass tube having a bore of the size it is desired to give the opening. The coefficient of expansion of platinum being practically the same as that of glass, the glass will not be broken, nor will the joint between the glass and platinum be injured by the expansion and contraction of the parts when a platinum tube is used. By using the platinum or extra glass tube at this juncture the pumps can be made mechanically alike.

Third. Instead of using a separate bulb connected with the second drop-tube for containing the phosphoric anhydride or other drying agent, I place such drying agent directly in the enlarged upper end of this drop-tube, beneath the mercury-sealed stopple supporting the lamp or other chamber to be exhausted. A vessel constructed of proper material is used to hold the drying agent, around the sides of which vessel the air is drawn downwardly. The vessel has a contracted mouth, so that any mercury which may run into the top of the tube will not enter the vessel.

In the drawings, Figure 1 is an elevation and partial section of the principal parts of a Sprengel drop embodying my improvements; Fig. 2, a view of a modified form of the inner or regulating tube; Fig. 3, a separate view of the vessel for containing the drying agent.

A is the first drop-tube, B the second drop-tube, and C the fall-tube, all of glass. The first drop-tube, A, is preferably bent at or near a right angle, entering the second drop-tube, B, nearly or quite horizontally. If thus bent, the horizontal or nearly horizontal portion forms what may be called the "trap" H, but which is an integral portion of the first drop-tube.

D is a tube, of iron, glass, or other hard material, having a fine bore of definite size and held by rubber stopple E in the upper end of the glass drop-tube A. In Fig. 2 the tube is shown as formed at the apex of a funnel, F, having a shoulder or flange, *f*, resting on the upper end of tube A, a suitable washer being provided, if necessary, to make a tight joint.

G is the tube, of platinum or glass, sealed into the glass at the junction of the first drop-tube, A, with second drop-tube, B, and in the portion of the drop-tube A hitherto designated as the "trap H." It is evident that this means of joining any two tubes in the pump where a definite-sized orifice is desired at the junction may be advantageously used.

I is the vessel for containing the phosphoric anhydride, having contracted mouth $i$, and it is set into the enlarged upper end, $b$, of B below the mercury-sealed stopple K, supporting lamp L or other vessel to be exhausted.

M is a pipe leading to the mercury-reservoir, while the fall-tube C leads to a receptacle from which the mercury is raised to the reservoir by suitable means and used over again.

What I claim is—

1. In a Sprengel drop-pump, a drop-tube having an inner tube forming the strangulation or contraction for the mercury and removably secured within it, substantially as set forth.

2. In a Sprengel drop-pump, the removable inner tube, for the purpose set forth, held by a stopple or surrounding packing, substantially as set forth.

3. In a Sprengel drop-pump, the combination, with the two drop-tubes, of a section of tube sealed within one of the drop-tubes at the junction of the two drop-tubes and forming a contraction thereat, substantially as set forth.

4. The combination, with the exhaust-tube of a Sprengel air-pump, of a separate vessel placed in said exhaust-tube between the inlets of the vessel to be exhausted and the mercury for effecting the exhaustion, and adapted to contain a drying agent, substantially as set forth.

This specification signed and witnessed this 1st day of July, 1881.

THOS. A. EDISON.

Witnesses:
RICHD. N. DYER,
H. W. SEELY.